Figure 1:
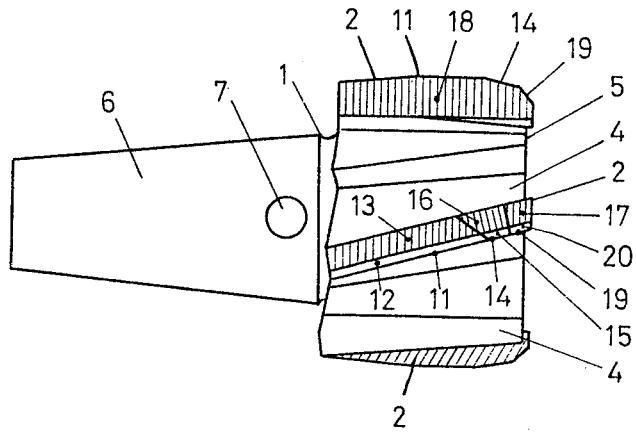

United States Patent [19]

Vig

[11] 4,086,733
[45] May 2, 1978

[54] METHOD OF MAKING A REAMER, AND A REAMER MADE IN ACCORDANCE WITH THIS METHOD

[75] Inventor: Istvan Vig, Olten, Switzerland

[73] Assignee: Merz AG Dulliken, Dulliken, Switzerland

[21] Appl. No.: 694,482

[22] Filed: Jun. 9, 1976

[30] Foreign Application Priority Data

Jun. 12, 1975 Switzerland ............ 7590/75

[51] Int. Cl.² .............................................. B24B 1/00
[52] U.S. Cl. .................................. 51/288; 76/101 A; 407/61; 408/230
[58] Field of Search ................... 29/103 R, 105 A; 51/288; 76/101 A; 408/227–230

[56] References Cited

U.S. PATENT DOCUMENTS

| 1,798,314 | 3/1931 | Dillard | 76/101 A |
| 1,887,373 | 11/1932 | Emmons | 76/101 A |
| 2,474,643 | 6/1949 | Webb | 76/101 A |
| 3,182,531 | 5/1965 | Moore | 408/229 |
| 3,207,196 | 9/1965 | Stillwagon | 408/229 |
| 3,834,090 | 9/1974 | Wasser | 51/288 |
| 3,973,455 | 8/1976 | Slaats | 76/101 A X |

Primary Examiner—Gary L. Smith
Attorney, Agent, or Firm—William J. Daniel

[57] ABSTRACT

A reamer is provided with substantially helical extending carbide-bladed teeth by forming a reamer body having roughly shaped helical teeth thereon along the front face of each tooth a groove extending rectilinearly lengthwise and obliquely to the reamer axis, inserting into each such groove a small straight carbide strip shaped to fit snugly within the groove, the height of the strip being such that its upper end projects radially, over its whole length, above the tooth end and also beyond the extended diameter of the reamer, such strip also extending obliquely of the reamer axis, and subjecting each such strip to a grinding operation in which its upper end projecting beyond the reamer diameter is first rounded off to conform to the reamer diameter and a first cutting edge is formed at the leading edge thereof, and then the end portion of the strip is separately ground to produce a main cutting edge inclined at an angle to said first cutting edge in the direction of said reamer axis.

15 Claims, 4 Drawing Figures

U.S. Patent  May 2, 1978  4,086,733

METHOD OF MAKING A REAMER, AND A REAMER MADE IN ACCORDANCE WITH THIS METHOD

This invention relates to a method of making a reamer having helically extending teeth and carbide blades, and to a reamer made in accordance with this method.

Reamers with helically extending teeth are generally made completely of tool steel, particularly high speed steel. The cutting edges of these reamers, which are ground along the tooth ends at the front, wear out relatively rapidly as compared with carbide blades and therefore have to be frequently reground. Thus, with these reamers the edge lives are relatively short as compared with reamers having carbide blades, and maintenance costs are relatively high because of the frequent regrinding.

On the other hand, the manufacture of a reamer with helically extending teeth and correspondingly extending carbide blades is so costly that the increase in edge life and the reduction in maintenance costs, which can be achieved by means of the carbide blades, cannot compensate for the additional manufacturing costs. This is primarily because the curvature of a helical line is different for each diameter and each pitch, and therefore a separate carbide sintering mould was needed for every bore diameter and pitch, so that for instance 100 different carbide sintering moulds were necessary for the manufacture of a set of reamers for 20 different bore diameters with 5 different pitches. These carbide sintering moulds are extremely costly and their cost would of course have to be absorbed in the cost of the reamers, and it is therefore clear that the added cost for a reamer having helically extending teeth with carbide blades could under certain circumstances, amount to several times the toal cost of manufacture of a similar reamer without carbide blades. Therefore, reamers with helically extending teeth and carbide blades have been limited to special purposes, where it was not possible to dispense with the advantageous machining properties of carbide bladed reamers, and therefore the relatively high costs of manufacture could be justified. These special cases frequently involved the reaming, in mass production, of predetermined holes in an object made in very large quantities, for instance on a conveyor belt. For this, only one particular reamer size was needed (with predetermined bore diameter and predetermined pitch) which could be made with only one special carbide sintering mould at relatively low expense.

Otherwise, if machining quality and the advantageous machining properties of reamers with helically shaped teeth were required reamers consisting wholly of tool steel have been used without regard for durability, or else, if great durability was of primary importance, carbide bladed reamers having rectilinear teeth parallel to the axis have been used instead.

In the latter case, that is to say in the case of reamers with rectilinear teeth parallel to the axis, the carbide blade causes no direct additional expense, because the blade configuration is the same with rectilinear teeth, for any size bore diameter and rectlinear carbide blades in several standardised size are directly obtainable on the market at acceptable cost.

Apart from the abovementioned special cases, therefore, hitherto a manufacturer had to choose between (1) reamers consisting wholly of tool steel and having helically shaped teeth, with the advantages of low costs and high machining quality, but with the disadvantage of low durability, (2) reamers with helically shaped teeth and carbide blades, with the advantages of great durability and high machining quality, but with the disadvantage of disproportionally high costs, or (3) reamers with rectilinear teeth and carbide blades, with the advantages of relatively low costs and great durability but the disadvantage of low machining quality, and for each need a compromise solution had to be found within these possibilities.

The invention has the objective of providing a method of making a reamer with helically extending teeth and carbide blades, at substantially lower costs which combines all the advantages of the previously mentioned three types of reamers, that is to say relatively low cost of manufacture, high machining quality and great durability.

According to the invention this is achieved by an arrangement in which each tooth on the reamer body is provided along its front flank with a rectilinearly extending groove or notch extending from its front end lengthwise of the tooth, and a small generally prism-shaped straight carbide strip is received in the groove, the shapes of the groove and strip being mutually complementary. The radial dimension of the carbide strip when seated in the groove is such that the strip projects radially, over its entire length, beyond the top edge of the tooth and also beyond the intended working diameter of the reamer. The respective strips are then subjected to a grinding operating in which first the extremities thereof projecting beyond the working diameter are ground off on an arc conforming to the working diameter to leave a front edge on the side corresponding to the front flank of the tooth while the rear edge of the arc merges into a rake surface extending toward the rear flank of the tooth, and second the main cutting edges are ground on the strips in the region of their front ends.

The present invention has the advantage that as with known reamers with straight carbide-bladed teeth parallel to the axis identical straight carbide strips can be used for reamers of any required bore diameter and any required pitches, and therefore it is no longer necessary to have carbide blades custom made for each reamer size and tooth pitch. Of course, the shape of the front edges ground on to the carbide strips during the grinding of the top arc is not precisely helical, because these front edges are in practice actually parts of the line of intersection of a cylindrical surface with a plane inclined to the axis of this surface and accordingly are parts of an ellipse. However, during the subsequent hollow grinding of the front face the shape can without difficulties be made helical. Moreover, it has been found that cutting edges shaped as an arc of an ellipse, involve no disadvantages but on the contrary may have machining properties still more advantageous than the machining properties of reamers with true helical carbide-bladed teeth.

Advantageously, in this method prism-shaped small carbide strips, preferably in the shape of four- or five-sided prisms with two side surfaces at right angles to one another, may be used, and the grooves or notches may be so formed in the reamer body that each groove has two flat wall surfaces extending in the direction of the length of the groove and preferably at right angles to one another to form its floor and rear wall. For securing the small carbide strips in the grooves, they may advantageously be soldered into the grooves, preferably by hard soldering. Alternatively they may be bonded in by suitable metal bonding agents.

In addition to the previously mentioned grinding operations, the grinding of the small carbide strips may advantageously comprise still further grinding operations in which the front face of each carbide strip is hollowed out so that the angle included between such front face and the top arc is an acute angle which is the same over the length thereof, and simultaneously the common edge, which is the apex of this angle and forms the secondary cutting edge of the reamer, acquires a more helical configuration. Alternatively, a flat face is produced on the front side of each strip defining the secondary cutting edge at the intersection of the front face and the top arc, which edge has the shape of an arc of an ellipse. Also a rake surface is ground on the top of the strip rearwardly of the top arc, which surface is inclined toward the rear flank of the tooth, the latter arrangement being preferably such that the peripheral extent of the top arc is approximately constant along the strip length.

In the second grinding operation, for further improving the durability and for reducing the specific cutting edge loading, cutting edges with a curling cut may advantageously be ground on to the small carbide rods. Sooner or later, the outer end of each blade is ground to form the main cutting edge, which preferably is in two sections, the outermost having increasing inclination away from parallel to the reamer axis and consisting of what can be designated a supplemental main cutting edge. Also, rake surfaces for the two sections of the main cutting edge need to be ground.

In a preferred embodiment, the teeth and strips are at least approximately equal in length. This has a series of advantages, because in this case firstly the grooves can extend over the whole tooth length, and this substantially simplifies the production and machining of the grooves, and secondly the body can be made of cast steel or some other castable metal. This is because the reamer body has only the function of carrying the carbide strips, and does not supply actual cutting edges. Finally this base body made of cast metal can be provided with pre-formed grooves in the teeth, and this results in further simplification of manufacture. In this preferred embodiment of the present method the grooves may advantageously be so located that each groove extends at least in the corresponding tooth approximately parallel to a secant which at the tooth ends intersects the helical line of that tooth. Preferably the reamer consists of a reamer shank provided with a hollow cone at its front end, and a reamer head provided with a conical neck fitting into the hollow cone, and for making the reamer head a base body consisting of cast metal, preferably cast steel, is used which has a headpiece with helically extending teeth already provided with pre-formed grooves, and a conical neck on the headpiece.

But the present method can also be used for making reamers with teeth greater in length than the small carbide strips, and still achieve the abovementioned advantages of great durability and high machining quality with relatively small costs of manufacture. The great durability is ensured in this case also, because the main cutting edges which receive the most wear occur adjacent the outer ends of the teeth where the small carbide strips are located, and outside this region the teeth carry only secondary cutting edges which wear more slowly as compared with the main cutting edges.

The invention further concerns the reamer, resulting from the present method, which is characterised by a reamer shank, a reamer head with generally helically shaped teeth, a cone coupling between the reamer shank and the reamer head, each tooth having a straight groove extending obliquely of the head axis over its entire length and formed by two flat surfaces at right angles to one another, and a small carbide strip affixed into each groove, each strip having a length corresponding at least approximately to the tooth length and side surfaces in contact with the wall surfaces of the groove, the outer end of the strip being rounded off to conform to the reamer diameter and defining along its front edge a substantially helically shaped secondary cutting edge, lying in an imaginary cylindrical surface which is coaxial with the reamer axis and equal to the diameter of the reamer, a rake surface extending rearwardly from said round edge, and at least one main cutting edge, with an adjacent primary and secondary rake surface.

Figure 4:
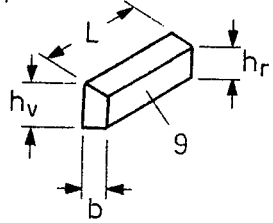
Figure 2:
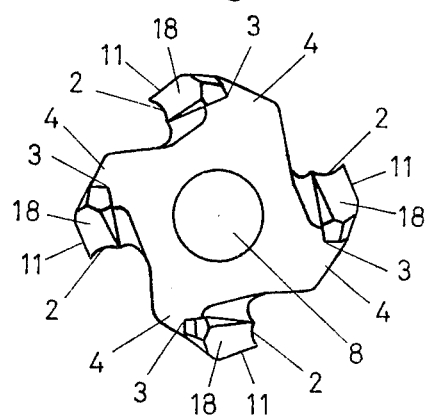
Figure 3:
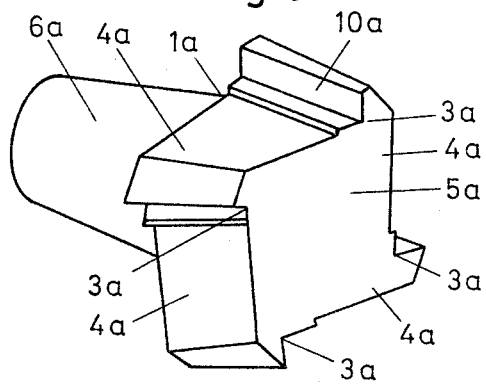

The invention is described in further detail hereunder with reference to an embodiment of a reamer made in accordance with the present method and illustrated in the following drawings, In these drawings, FIG. 1 shows the head of a reamer made in accordance with the present method, in side elevation, FIG. 2 shows a front or end view of the reamer head illustrated in FIG. 1, FIG. 3 shows a cast steel body used for making a reamer head as shown in FIG. 1, and FIG. 4 shows a small carbide strip used for making a reamer as shown in FIG. 1.

The reamer head shown in FIG. 1 and made in accordance with the present method can be used for instance in conjunction with a reamer shank as known from Swiss patent application No. 13,983/74.

The reamer head 1 is provided with four carbide blades 2 which are brazed into grooves 3 of a headpiece 5 provided with helically extending teeth 4. The headpiece 5 is integrally connected to the conical neck 6 which is provided with the cylindrical driver pin 7.

For making a reamer head as shown in FIG. 1, first of all a body consisting of cast steel as shown in FIG. 3 is made. In making the mould for this base body the following has to be borne in mind. In principle, what is actually to be made is a reamer with helically extending teeth and carbide blades at the teeth edges. However, only the edges of the carbide blades 2 become effective for reaming. Care must therefore be taken to ensure that in the finished reamer head the shape of these edges corresponds as far as possible to the required helical shape. The design must therefore first begin with a cylindrical surface having the bore diameter of the reamer, and from this cylindrical surface is established the four helical lines that are the tooth edges. After that, through each of the helical lines a reference plane intersecting the cylindrical surface must be passed as closely as possible. For this purpose the reference plane may for instance be advantageously so located that it contains a straight reference line intersecting the helical line at one of its ends and again at a distance corresponding to the length of the small carbide strips being used, plus a point on the helical line located in the middle region between these end points of intersection. Next, the line of intersection of the resultant reference plane with the cylindrical surface is identified, and the greatest distance between this line of intersection and the straight reference line is determined. The groove to receive the small carbide strip is now so located that assuming the strip is prism-shaped as shown in FIG. 4, the groove has a first (rear) flat surface spaced from the reference plane somewhat less than the width $b$ (see FIG. 4) of the small carbide strip, and parallel to this plane, and a second flat (floor) surface lying in a third plane perpendicular to the reference plane, and the distance from this third plane to the straight reference line portion is somewhat smaller than the difference between the height $h_v$ (see FIG. 4) of the front side of the small carbide rod to be used and the abovementioned greatest distance between the straight reference line portion and the line of intersection of the reference plane with the cylindrical surface. The first and second surface of the groove are at right angles to one another and form a common inside corner. The height $h_r$ (see FIG. 4) of the rear side of the small carbide strip. The width of the second flat surface is made somewhat less than the distance of the rear groove faces from the reference plane. The length of the first and of the second flat surface is made approximately equal to the length L (see FIG. 4) of the small carbide strip to be used. The positions of the beginning and end of the groove corner are such that when they are joined to the beginning and end points of the straight reference line a rectangle is produced and that the joining lines are at right angles to the corner. The spatial position of the groove relatively to the cylindrical surface and to the helical line on the cylindrical surface, and also the formation of the groove, are thereby completely defined. In a corresponding way the other three grooves are now to be defined in the design. In accordance with what has been said above, the headpiece 5a of the cast body to be made must only satisfy the condition that it can contain the four spatially defined grooves and that its other parts do not project beyond the abovementioned cylindrical surface. The headpiece 5a of the cast body to be made serves only as a carrying element for the abovementioned grooves 3a, and in other respects its shape, apart from the condition that it must not project beyond the cylindrical surface, may be formed in any desired way whatsoever. In FIG. 3, therefore, a shape of the "teeth" 4a carrying grooves 3a is shown which differs from the shape of the teeth 4 in the reamer head 1 illustrated in FIGS. 1 and 2. In addition to the headpiece 5a carrying the four grooves 3a the cast body 1a to be made must also have a conical neck 6a. In making the casting mould for this cast body it is to be borne in mind that the groove walls (that is to say the first and second surfaces) of the grooves 3a still have to be ground smooth or flat after casting. Therefore, and appropriate machining allowance for grinding smooth must be provided on these groovewalls. Likewise, in the case of the conical neck 6a also, an appropriate machining allowance must be provided in the diameter, because this neck too still has to be ground so as to accurately conical.

By means of the casting mould made in this way, reamer bodies consisting of cast steel as shown in FIG. 3 are cast, and then the groove walls of the grooves 3a are ground, and the abovementioned machining allowances are ground off. The cast bodies are then provided at the front and at the back with centre bores (8 in FIG. 2), and then the neck 6a is ground conical between points and provided with a transverse bore for the driver pin 7. A small carbide strip corresponding to the one shown in FIG. 4 is then soldered into each groove, in such a manner that the side surface 9 of the small carbide strip is in contact with the first surface 10a of the groove in each case. After the small carbide strips have been soldered in, the grinding of these rods is effected. For this purpose the head is again gripped between points and then first of all the outer ends of the small carbide strips projecting beyond the above-mentioned cylindrical surface are ground off. By this first grinding operation a top arc 12 lying in this cylindrical surface is formed at each strip end. Then, with the aid of a template guide for the grinding disc a front face 18 is ground on to the side of each strip forming the front flank of the tooth. The line of intersection of this face with the top end arc 12 lines on the helical line of the tooth 4, and in the vicinity of this line an acute angle of about 86° to 84°, which is constant along the line of intersection, is included between the face surface of this face and the surface of the top arc. Simultaneously with this grinding of the face 18, the helically extending secondary cutting edge 11 formed by the edge common to the face 18 and to the top arc 12 is ground on to each small carbide strip 2. After this, a rake surface 13 extending from the top arc 12 towards the rear flank of the tooth is ground on the remainder of the outer end of each carbide strip, in such a manner that as a result the width of the top arc 12 is constant along the secondary cutting edge 11. This grinding operation also is effected with the aid of a grinding disc guided by a template. Then, separate secondary rake surfaces 16 and 17 corresponding to the two sections of a main cutting edge are ground in the region of the front end of each carbide strip. These two rake surfaces are flat surfaces. Two secondary rake surfaces initially extend completely to the face 18. Then, in the region of the transition between secondary rake surface 16 and the face 18, the main cutting edge 14 and an associated adjacent primary rake surface 15 are ground on, and after this, in the region of transition between the secondary rake surface 17 and the face 18, a supplemental main cutting edge 19 and an associated adjacent supplemental primary rake surface 20 are ground on. The two primary rake surfaces 15 and 20 of the main and supplemental cutting edges 14 and 19 are also flat surfaces with a relatively small rake angle and as they are ground, edges 14 and 19 are incidentally produced. When the two primary rake surfaces 15 and 20 have been ground, the grinding of the reamer head is finished and the reamer head 1 is now ready for use with an appropriate reamer shank.

I claim:

1. A method of making a reamer with helically extending carbide cutting edges and having a given diameter characterized in that a reamer body having roughly shaped helical teeth thereon is provided along the front face of each tooth with a groove extending rectilinearly lengthwise and obliquely to the reamer axis, a small straight carbide strip shaped to fit snugly within the groove is fixed in each groove, the height of the strip being such that its upper end projects radially, over its whole length, above the tooth end and also beyond said given diameter of the reamer, said carbide strip extending obliquely of the reamer axis, and each such strip is subjected to a grinding operation in which its upper end projecting beyond said given reamer diameter is first rounded off to conform to said given reamer diameter and a first helically extending cutting edge is formed at the leading edge thereof by grinding a helically extending face on the front surface thereof, and then the end portion of the strip is separately ground to produce a main cutting edge inclined at an angle to said first cutting edge in the direction of said reamer axis.

2. A method according to claim 1, characterized in that said carbide strips are prism-shaped.

3. A method according to claim 1, characterized in that the carbide strips are soldered or bonded into the grooves.

4. A method according to claim 1, characterized in that the angle between said front face surface and the top arc is an acute angle of constant magnitude along the strip length.

5. A method according to claim 1, characterized in that the reamer is of a type in which the teeth are greater in length than the length of the straight carbide strips, and the grooves are so formed in said reamer body that each groove extends at least approximately parallel to a secant which adjacent the beginning and the end of the groove intersects the helical line of the corresponding tooth, and the carbide strip portions projecting outside said given diameter are so ground that the helically extending cutting edge formed thereon merges without a corner with the edge of the tooth outside the region of the groove.

6. A method according to claim 1, characterized in that the reamer is of a type in which the length of the teeth is at least approximately equal to the length of the carbide strips so that each groove extends over the whole length of the corresponding tooth and the grooves are so formed in said reamer body that each groove extends at least approximately parallel to a secant which at the tooth ends intersects the helical line of the corresponding tooth.

7. A method of making a reamer with carbide cutting edges and having a given diameter characterized in that a reamer body having roughly shaped helical teeth thereon is provided along the front face of each tooth with a groove extending rectilinearly lengthwise and obliquely to the reamer axis, a small straight carbide strip shaped to fit snugly within the groove is fixed into each groove, the height of the strip being such that its upper end projects radially, over its whole length, above the tooth end and also beyond said given diameter of the reamer, said strip extending obliquely of the reamer axis, and each such strip is subjected to a grinding operation in which its upper end projecting beyond said given reamer diameter is first rounded off to conform to said given reamer diameter and the front surface of each carbide strip is ground to form a flat face whereby the resultant edge common to said flat front face and said top arc constitutes a first cutting edge which has the shape of an arc of an ellipse and approximates a helix, and then the end portion of the strip is separately ground to produce a main cutting edge inclined at an angle to said first cutting edge in the direction of said reamer axis.

8. A method according to claim 7, characterized in that said carbide strips are prism-shaped.

9. A method according to claim 7, characterized in that the carbide strips are soldered or bonded into the grooves.

10. A method according to claim 7, characterized in that the reamer is of a type in which the teeth are greater in length than the length of the straight carbide strips, and the grooves are so formed in said reamer body that each groove extends at least approximately parallel to a secant which adjacent the beginning and the end of the groove intersects the helical line of the corresponding tooth, and the carbide strip portions projecting outside said given diameter are so ground that the helically extending cutting edge formed thereon merges without a corner with the edge of the tooth outside the region of the groove.

11. A method according to claim 7, characterized in that the reamer is of a type in which the length of the teeth is at least approximately equal to the length of the carbide strips so that each groove extends over the whole length of the corresponding tooth and the grooves are so formed in said reamer body that each groove extends at least approximately parallel to a secant which at the tooth ends intersects the helical line of the corresponding tooth.

12. A reamer head having rectilinear carbide blades with cutting edges extending according to a helical configuration and having a given diameter, which comprises a reamer head body having around its periphery a plurality of spaced rectilinear grooves extending obliquely of the head axis, a rectilinear carbide blade strip secured in each such groove and also extending obliquely of the head axis, the outer surface of each such strip projecting exteriorly of the outer extremity of the head and being rounded generally in an arc conforming to the selected working diameter of the reamer, said strip having a front face and defining with the rounded outer end a common edge which constitutes a cutting edge extending in accordance with a helical configuration.

13. The reamer of claim 12 wherein an outer end corner of the rounded surface of each said strip is ground with at least one flat surface inclined toward said head axis, said flat surface defining with the front face of the strip a common edge which constitutes a primary cutting edge extension of said helical cutting edge.

14. A reamer head having rectilinear carbide blades with angularly extending cutting edges and having a given diameter, which comprises a reamer head body having around its periphery a plurality of spaced rectilinear grooves extending obliquely of the head axis, a rectilinear carbide blade strip secured in each such groove and also extending obliquely of the head axis, the outer surface of each such strip projecting exteriorly of the outer extremity of the head and being rounded generally in an arc conforming to the selected working diameter of the reamer, said strip having a front face and defining with the rounded outer end a common edge which constitutes a cutting edge extending in the shape of an arc of an ellipse defined by the intersection of an imaginary plane passed through said strip front face with the reamer periphery, the shape of said elliptical arc approximating a helix.

15. The reamer of claim 14 wherein an outer end corner of the rounded surface of each said strip is ground with at least one flat surface inclined toward said head axis, said flat surface defining with the front face of the strip a common edge which constitutes a primary cutting edge extension of said cutting edge.

* * * * *